(12) United States Patent
Olesen

(10) Patent No.: US 6,366,216 B1
(45) Date of Patent: *Apr. 2, 2002

(54) METHOD AND A SYSTEM FOR MONITORING PLURALITY OF MOVABLE OBJECTS

(75) Inventor: Lykke Olesen, Djurhamn (SE)

(73) Assignee: Unwire AB, Solna (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,300
(22) PCT Filed: May 23, 1997
(86) PCT No.: PCT/SE97/00848
§ 371 Date: Nov. 23, 1998
§ 102(e) Date: Nov. 23, 1998
(87) PCT Pub. No.: WO97/44683
PCT Pub. Date: Nov. 27, 1997

(30) Foreign Application Priority Data

May 23, 1996 (SE) ................................................ 9601971

(51) Int. Cl.[7] .............................................. G01S 13/78
(52) U.S. Cl. .............................. 340/825.49; 340/10.1; 340/10.31; 340/936; 340/426; 342/44
(58) Field of Search .................... 340/825.49, 10.1, 340/825.69, 10.3, 825.72, 10.32, 425.5, 439, 10.42, 441, 10.52, 571, 572.1, 989; 342/42, 44, 51; 455/410, 440, 456

(56) References Cited

U.S. PATENT DOCUMENTS

| | | | | |
|---|---|---|---|---|
| 4,023,138 A | * | 5/1977 | Ballin | 340/825.72 |
| 4,897,642 A | * | 1/1990 | DiLullo et al. | 340/825.06 |
| 4,918,425 A | * | 4/1990 | Greenberg et al. | 340/539 |
| 5,387,916 A | * | 2/1995 | Cohn | 342/44 |
| 5,402,104 A | | 3/1995 | LaRosa | 340/539 |
| 5,506,584 A | | 4/1996 | Boles | 342/42 |
| 5,532,690 A | * | 7/1996 | Hertel | 340/989 |
| 5,569,848 A | * | 10/1996 | Sharp | 73/146.2 |
| 5,594,740 A | * | 1/1997 | Ladue | 455/410 |
| 5,884,173 A | * | 3/1999 | Sollner | 455/436 |

FOREIGN PATENT DOCUMENTS

| | | |
|---|---|---|
| WO | 85/03579 | 8/1985 |
| WO | 89/05460 | 6/1989 |

* cited by examiner

*Primary Examiner*—Edwin C. Holloway, III
(74) *Attorney, Agent, or Firm*—Jacobson Holman, PLLC

(57) ABSTRACT

A method and a system for monitoring a plurality of movable objects, wherein each of the objects is equipped with a transponder with which a stationary node is arranged to communicate. Each transponder is caused to reply to a unique signal from the node and each transponder that sends a response signal gives to the response signal a transponder identification addition. A node is caused to detect the speed and direction at which each transponder moves towards and away from the node. Movement of the transponder relative to the node is evaluated by node associated means on the basis of the speed and direction of the transponder. A register over those transponders with which the node shall communicate is set-up for each node. A plurality of separate nodes are provided and each node is provided with such a register. The nodes are arranged to communicate with one another, so as to enable a node to record in its monitoring register a transponder from another node.

12 Claims, 2 Drawing Sheets

METHOD AND A SYSTEM FOR MONITORING PLURALITY OF MOVABLE OBJECTS

BACKGROUND OF THE INVENTION

Field of the Invention

The present invention relates to a method and to a system for monitoring movable objects in which each of the objects is provided with a transponder and in which a stationary node is arranged to communicate with the transponders, wherein the node sends to each transponder a signal which is identified solely by the transponder in question, wherein each transponder sends to the node a response signal in response to the signal from the node, wherein the response signal identifies the transponder concerned. The node can thus be forced to detect the speed and direction of each transponder towards and away from the node. Node associated means can then be caused to evaluate movement of the transponder in relation to the node, on the basis of the speed and direction of the transponder. This technique is known from U.S. Pat. No. 5,506,584, for instance.

The present invention finds use, for instance, in monitoring boats in harbours, and it is, of course, of interest in this regard to be able to limit the monitored area on the one hand, so that communication between node and transponder can always be maintained despite varying weather conditions. It is also of interest to be able to measure whether or not the boat/transponder moves relative to the node within the monitored area.

SUMMARY OF THE INVENTION

An object of the present invention is to provide a method and a system with which transponder movement and distance of the transponder from the node can be monitored, and with which the transponder can be tracked between different nodes.

This object is achieved with a method and system whereby each node is set up with a register of the transponders with which the node shall communicate; a plurality of separate nodes, each having such a register, are provided; and the nodes are enabled to communicate with one another such that a node is able to take over in its monitoring register a transponder from another node. The method and system may further include delivery by the node of an alarm signal when the distance of the transponder from the node deviates from a permitted value, or when the speed of the transponder exceeds a predetermined value. An alarm may also be triggered when a transponder leaves a node in which the transponder is registered. Detection by the node may be effected by the Doppler effect.

The fact that the transponder delivers a unique signal enables the unique transponder signal to be associated with a telephone network subscriber. For instance, by coupling the node to a telephony system, the subscriber is able to send a message to the transponder via the telephony system when the node discovers that the transponder concerned is located outside its permitted area or moves at a speed which exceeds a predetermined value. For instance, the node can be caused to detect a Doppler-shift response from each transponder, this Doppler shift constituting a measurement of the speed at which the transponder moves towards or away from the node.

The transponders normally respond to a coded microwave signal from the node with a coded Doppler-shift response. The node sends coded signals to the transponders in accordance with a given sequence at pre-programmed time intervals, preferably constant time intervals. The signal from the node is coded so that only the intended transponder is able to react to the node signal. The transponder includes a computer which is programmed to activate the transponder for transmission when the code of the node signal agrees with the identity of the transponder. When the transponder returns a coded signal to the node, this reply signal is also given a code that identifies this transponder. Naturally, the computer in the transponder may also be programmed to add additional information to the transponder output signal. For instance, a theft alarm or burglar alarm may be coupled to the computer of the transponder, so as to cause the computer to add corresponding information to the transponder reply signal, thereby enabling an alarm signal to be sent by the node to an alarm receiver, via a communications system (telephony system). For instance, the transponder may have an identity corresponding to a telephone subscriber number, so as to enable an alarm to be signalled to the subscriber with a message corresponding to the current alarm state associated with the transponder in question, this signal being sent directly from the node via a telephony system, for instance the GSM system.

The technique of detecting movement of the transponder towards or away from the node with the aid of a Doppler effect for instance, also enables the absolute position of the transponder to be calculated by numerical integration of the speed fixes, although absolute determination of the transponder position will preferably be carried out at close intervals. However, the invention is not limited to the use of a Doppler effect for detecting transponder movement and speed.

The invention enables movement of the transponder to be detected, or sensed, within the permitted transponder area that lies well within the range of the node/transponder, therewith giving a clear indication that the transponder is moving away from its expected position while the transponder is located within the communication range of its node.

The fundamental concept of the invention enables several nodes to be used, each of which monitors its respective group of transponders, said nodes communicating with one another. When a transponder moves away from its node, out of the permitted area, the node is thus able to communicate with nearby nodes and initiate the nodes to search for the transponder concerned, the code of which is then passed to these remaining nodes. When one of these remaining nodes receives a response from the transponder concerned, the transponder can be dismissed from the groups of objects monitored by the other nodes. For example, the nodes may lie at a distance of 3 km apart, to enable such a handover to take place. The nodes may in turn, communicate with a main node which monitors the permitted movement area or a given transponder. The area can then be represented by a specific group of nodes. It is thus fully possible to connect the main node to a computer that monitors the permitted area of a given transponder. For instance, the main node may allow a given transponder to move within the permitted areas corresponding to overlapping of the permitted transponder areas of a predetermined number of nodes, the main node otherwise triggering an alarm to the person responsible for the transponder concerned. For example, a yacht may have been hired with under the provision that it must not leave an area defined by pre-determined permitted, mutually overlapping communication areas of the nodes with the transponder, wherewith the main node is able to initiate an alarm of some kind if the transponder concerned disappears from the permitted area. The main node may, in turn, be connected to other main nodes via known telecommunications equipment.

The nodes may be comprised of mobile units that have an own GPS equipment that determines the location of the node. The node may, in principle, include a transmitter, a receiver and logic that enables the node to monitor the transponders that are in the area monitored by the node and registered therein.

BRIEF DESCRIPTION OF THE DRAWINGS

The invention will now be described in more detail with reference to an exemplifying embodiment thereof and also with reference to the accompanying drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 3:
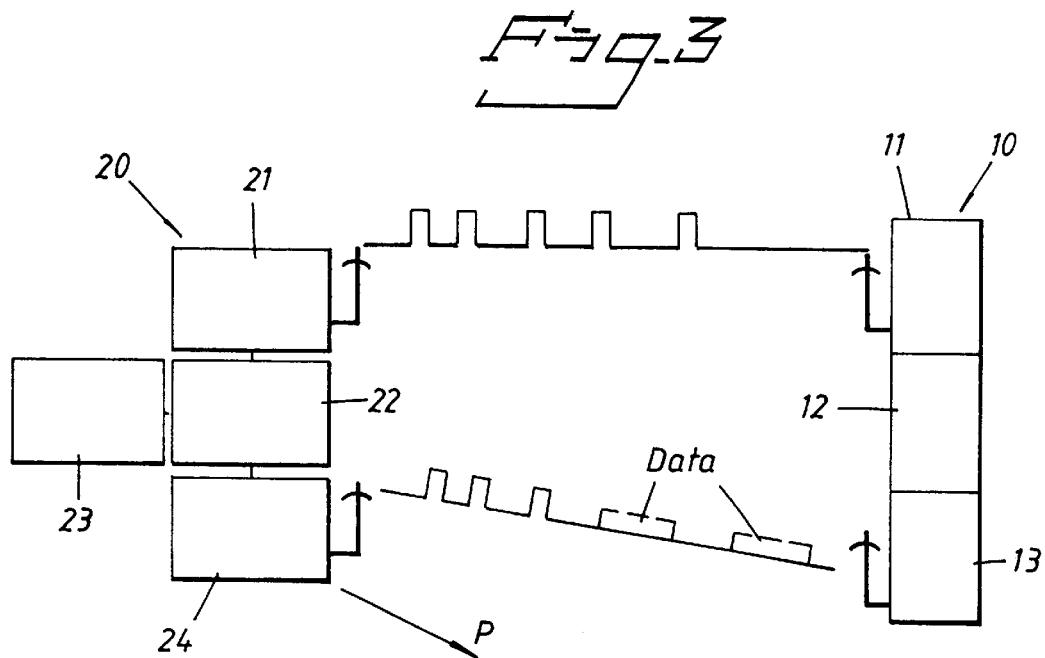
FIG. 3 is a schematic illustration of communication between a node and a transponder.

Referring first to FIG. 3, there is shown a transponder 10 that includes a receiver 11, a computer 12 and a transmitter 13. Also shown is a node 20 which includes a digital transmitter 21, logic 22, position determining equipment 23 and a receiver 24.

The transponder 10 is mounted on an object to be monitored. The transponder 10 may be passive or may have its own power source so as to provide better signal transmission back to the node.

The node 20 includes a register of a number of transponders 10 to be monitored. Each transponder has a unique identity/address. This address may consist of a signal code. The node 20 sends a signal to respective transponders 10 at predetermined time intervals. The node 20 sends the signal with the transponder code, so that only the intended transponder will recognize the signal. The transponder then sends a response signal to the node, preferably directly. The computer 12 provides the response signal with information concerning the identity of the transponder 10, so that the node 20 is able to decide whether or not the transponder concerned has actually replied. The computer 12 provided in the transponder 10 may be coupled to a burglar alarm or other alarm means, so that corresponding information can be transmitted to the node 20.

Although the node 20 is normally stationary, it may be mobile. The node therefore includes GDS equipment 23 which automatically monitors the position or location of the node 20. The node 20 has communications equipment for communication with other nodes.

The node 20 monitors a plurality of transponders 10 in its local area. By detecting whether or not a transponder moves towards or away from the node by means of the Doppler effect, the node logic 22 is able to decide whether or not the transponder concerned is located within a permitted area that lies well within the communications area. If a transponder 10 moves significantly, the node is able to deliver a signal to this effect either to an alarm centre or to the owner of the object on which the transponder 10 is mounted.

The node logic is able to determine the distance of the transponders, by integrating the speeds at which the transponders move established by the Doppler effect, although parallel absolute measurements of the position of the transponders 10 in relation to the node are preferably carried out.

Figure 2:
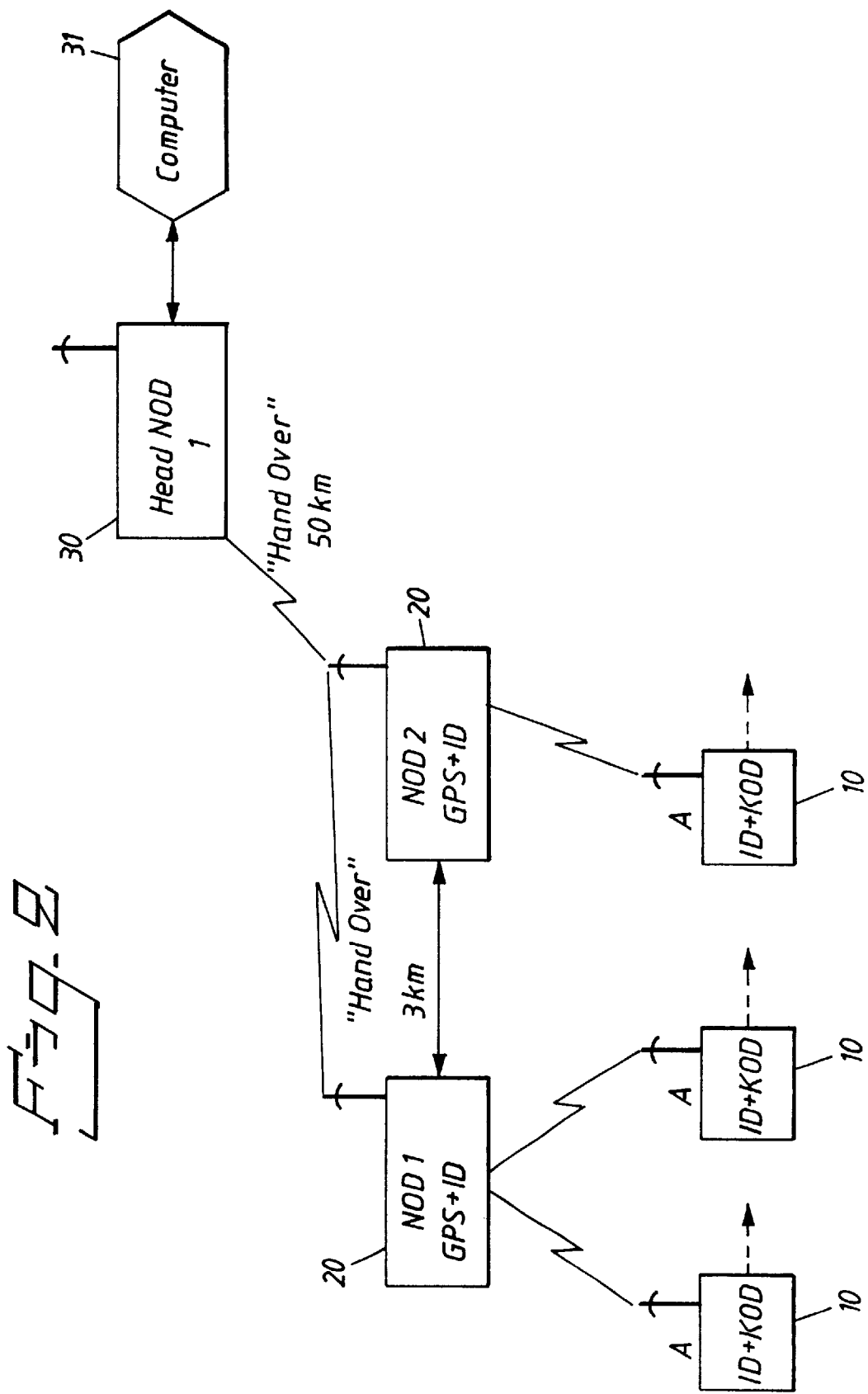
FIG. 2 is a schematic illustration of several interlinked systems.

If a transponder is detected to move in a non-permitted manner or to be located outside a permitted area in relation to the node 20 in which the transponder is registered, the node is able to communicate with neighbouring nodes, as illustrated in FIG. 2, such that the node 1 (FIG. 3) sends information P relating to the transponder concerned to a neighbouring node 2, so that said node can search for the transponder concerned in its monitoring area. If a neighbouring node, thus the node 2, detects the transponder concerned, the transponder can be inserted in the monitoring register of node 2 while deleting said transponder from the register of the previous node at the same time.

As illustrated in FIG. 2, the nodes 1, 2, etc., are also able to communicate with a main node which defines the conditions that are permissible with respect to a given transponder, and which also defines the conditions with respect to the transponder that shall initiate an alarm.

It can be assumed that a GSM telephone subscriber subscribes to a transponder 10 having a unique identity, for instance the telephone number of the subscriber. The transponder is mounted on a vessel in a harbour and monitored by a node. If the boat leaves its position or leaves the monitored area without permission, there is initiated via the node or via the main node 30 which can have a link to GSM or IMMARSAT, an alarm which passes to the subscriber telephone via the telephony system, so that the subscriber obtains this information. Alternatively, the information can, of course, be sent to a monitoring station 31 of some kind or other, e.g. an alarm centre. When the transponder is mounted on a rental or hired boat or a hired car, the rental company is able to readily ascertain whether or not the hired object has left the area in which it is allowed to move in accordance with the rental contract. Furthermore, it is beneficial for the rental or hire company to be able to trace the hired objected/transponder if/when it leaves the permitted area.

Figure 1:
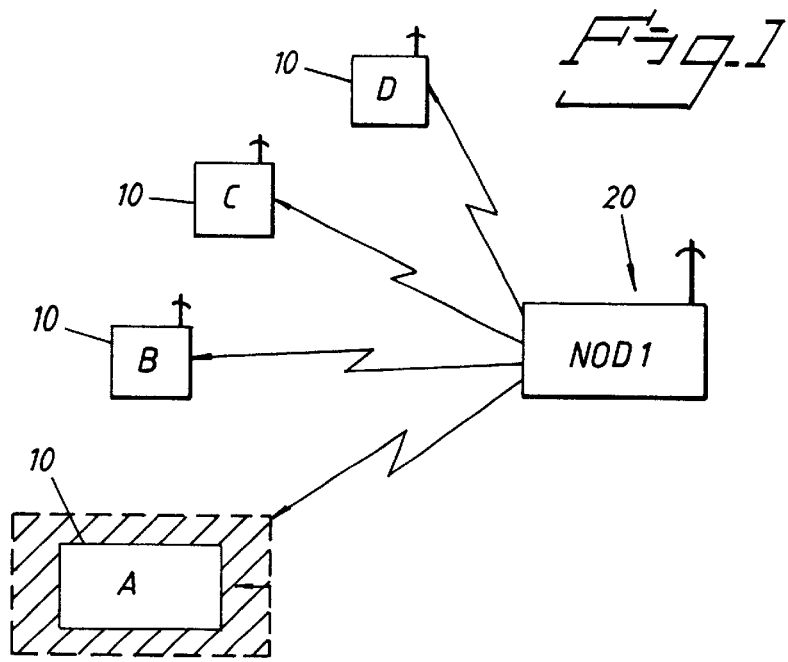
FIG. 1 illustrates schematically an inventive monitoring system.

With reference to FIG. 1, it will be seen that the node communicates with a plurality of transponders 10 (A, B, C, D) within its monitoring area. In this regard, the node may monitor a transponder 10 (A) with respect to a condition whereby it may not experience any movement towards or away from the node 1. Secondarily, the node may detect whether or not a transponder is located within a permitted area in relation to the node 20, i.e. that a transponder 10 is located within a permitted distance from the node 20.

The monitoring system is based on a node/base station and a plurality of units whose positions shall be monitored and which are scattered in the space within a distance R from the node. These units are equipped with transponders that respond to a coded microwave signal from the node with a coded response signal.

The code is described below, wherein solely the problems with and possible position determining solutions with the aid of the Doppler effect are considered. Because of the nature of the system, it is assumed that the node has at most a 3-DB antenna amplification (semi-directional), whereas the transponder has an omni-directional antenna (ER). The antennas will preferably be circular polarized, so as to be orientation insensitive.

Designations index r=received
index t=transmitted
'designates transponder membership (without' designates base units)
P=power
R=distance base unit—trasponder
G=antenna amplification
A=effective antenna area
g'=transponder amplification (may be smaller or greater than 1)
f=frequency
$f_o$=base unit transmitting frequency
B=base unit reception bandwidth
kT=Boltzmann's constant x temperature (Kelvin)
v=transponder velocity relative base unit
c=speed of light
Δf=Doppler shift
$\lambda = c/f_o$=transmitted wave length

Power Considerations

The starting equations are $$P_r' = P_t * G_t * A_r'/4\pi R^2$$

$$P_r = P_t' * G_t' * A_r/4\pi/R^2$$

With respect to the antennas it can be assumed that $G = 2*\pi*A/\lambda^2$ (50% antenna efficiency). With $P_t' = g'*P_r'$ there is then obtained $$P_r = P_t * g' * (G*G'/2)^2 * (\lambda/2/\pi/R)^4$$

provided that the response frequency is essentially equal to $f_o$. Assume that we have a passive transponder (without its own power source). Since the response from the transponder must—in addition to the Doppler shift—also be frequency shifted in relation to the base frequency so as not to be drenched in other reflected signals, g' may be at highest in the order of 0.01. G=2 and G'=1. With $f_o$=2.45 Ghz, R=500 m and $P_t$=1 W there is then obtained $P_r < 2.3*10^{-20}$ W.

Assume that v=+/−10 km/h is the maximum speed that can be expected. This corresponds to the Doppler shift $$\Delta f = 2 * v * fo/c = +/-45 \text{ Hz}.$$

Thus, the receiver bandwidth must be chosen as B=100 Hz, which gives $P_{noise} = k*T*B = 4*10^{-9}$ W. Because the signal is coded with more than 1 kb/s, the noise may be increased by a further power of 10. Thus, the base unit must have a power output of at least 200 W, in order for the response not to be drenched in noise. The conclusion is that an active transponder should be chosen even for the relative short distance of 500 m. With an active transponder, $P_r 40 = 1.5*10^9$ W under the same conditions. Thus, it is possible to reduce the power output to −30 dBm without being troubled by noise, and still obtain a range somewhere in the region of 3 km (B=1 kHz, signal/noise ratio 10). Naturally, this presumes that the transponder will also deliver an output signal of comparable strength.

Stability considerations

As before mentioned, it is necessary to add to the transponder a frequency shift in the order of at least 1 kHz in order to filter out undesirable echoes in the base station receiver. The frequency stability must be in the order of 1 Hz (v=6 cm/s). It is possible to include single-sideband or double-sideband modulation (Premid). Alternatively, frequency can be doubled or halved. This eliminates the stability requirement of the transponder, but may, instead, require separate receiving and transmitting antennas in both base station and transponder in order to fulfil the angular covering requirement. Furthermore, collision with permitted maximum radiation in these other bands may occur.

Measuring time and detectable movement

A. Incoherent Detection

At $f_o$=2.45 Ghz, a resolution of 1 Hz is required to indicate 6 cm/s, which gives a measuring time of at least 1 second. When 50 objects are to be monitored, it will take at least 50 seconds between the observations of an object. The object can have moved 3 m at 6cm/s or 140 m at 10 km/h in this space of time. If lower requirements are placed on the speed resolution, both measuring time and time intervals can be reduced. The smallest detectable movement will still be 3 m, although the value at 10 km/h will decrease proportionally.

In order to lower the bottom limit of detectable movement, it is necessary either to increase $f_o$ or to reduce the number of monitored objects.

The position of the monitored object must be calculated by numerical integration of the speed determinations. This quickly gives rise to large positional errors, particularly when monitoring vessels that are moored in a harbour, due to the reciprocatory motion that occurs. Furthermore, only movement towards or away from the base station is indicated, not sideways movement. In order to avoid false alarms or non-occurrent alarms, it will probably be necessary to effect absolute determination of the position at close intervals.

In order to decide whether the speed is directed towards or away from the base station, down-mixing is effected with an intermediate frequency in the order of at least 1 kHz, and not down to the baseband. If this is not generated in the transponder (sideband modulation), e.g. when doubling or halving the frequency, it must be generated in the base station.

B. Coherent Detection

A large number of the aforesaid problems can be circumvented, by effecting coherent detection to the baseband and by sampling the various monitored objects much more frequently. A choice can be made between homodyne detection or heterodyne detection. As before mentioned, homodyne detection produces difficulties in respect of determining direction. It is possible that such difficulties can be overcome with a high degree of accuracy in A/D conversion and the choice of an intelligent interpretation algorithm, although there will always be a danger of wrong interpretation of the velocity direction at some time point, resulting in a sudden change. A better solution is to insert a low intermediate frequency when down-mixing in the base unit. This greatly reduces the accuracy requirement of the A/D converter (4–5 bit accuracy suffices) and jitter in the sampling time-points is of but small importance. However, high requirements are placed instead on the accuracy at which the product of local oscillator frequency multiplied by sample time-point is calculated when interpreting the position of the object, or target. Because it is the absolute value of the accuracy in this product calculation that is of importance, the relative error in position determination will increase linearly with time, and a 0-position will probably be required at regular intervals if this linear error growth cannot be eliminated (see the following solution to the problem).

We double or half the frequency in the transponder and detect the signal heterodyne-wise in the base station, with a frequency double/frequency halved local oscillator signal converted up with a further intermediate frequency ($t_{LO}$). The voltage from the detector obtains the following form:

$$V(t)=V_e*\cos[2*\pi*(f_{LO}*t+N*2*R(t)/\lambda)+\phi],$$

N=2 when doubling or
N=0.5 when halving freq.
where $V_e$= the voltage envelope, which is slightly time-dependent due to aspect variations of the antennas. $\phi$ is a constant phase angle. For an unequivocal result, it is necessary that the time derivative of the phase in the cosine-function is always positive. Thus, if V=dR(t)/dt is maximum +/−10 km/h, it is necessary that $f_{LO}$ is at least N*50 Hz, where $f_o$=2.45 GHz.

This voltage is sampled at a rate at which the phase change between samples is kept beneath $\pi/2$ in the cosine function. With maximum v=10 km/h, the sampling frequency is at least N*400 sa/s, where $f_O$=2.45 GHz and $f_{LO}$ is chosen as N*50 Hz. The choice of a sampling frequency that is a multiple of $f_{LO}$ should be avoided, since synchronism can make determination of $V_e$ difficult (the peak values in the voltage response that are assumed to vary with a time constant much greater than $1/f_{LO}$). Arc cos $[V(t)/V_e]$ is then calculated. Since arc cos is not unequivocal, it is necessary when making the interpretation to rely on the condition that the phase change between mutually sequential samples is greater than 0 but less than $\pi/2$, and on an intelligent algorithm. Generally speaking, it is preferably ensured that Ve is underestimated rather than overestimated; the normalized values V(t)/Ve that exceed 1 are simply made equal to 1 in the interpretation.

The characteristic of the detector (linear, quadratic) plays a relatively small part. As before mentioned, $f_{LO}*t$ is a critical magnitude in the evaluation. With the sampling frequency $f_S$ and a counter S of the number of samples from start t=0 results in $$f_{LO}*t=S*f_{LO}/f_s$$

For accurate determination of the value of the product, $f_s$ will then be chosen as a multiple of $f_{LO}$, or preferably (in accordance with the earlier discussion) that both frequencies are multiples of a third frequency, e.g. $f_{LO}$=2*N*25 Hz and $f_S$=17*N*25 Hz.

Power requirement

Assume that a 32-bit address code is sent from the central unit and responded to with 32-bit data. Also assume that 50 objects are to be monitored. The data rate will then be at least 50*64*N*400=N*1.28 Mb/s. Each monitoring object is activated N*400 times and responds below 1% of the total time. With N*2 MHz bandwidth in the receiver, $P_{noise}$= N*8*10$^{-15}$ W is obtained. Because the transponder transmits on N times the frequency and with the distance 500 m, the pulse power $P_t$=N$^3$*21*10$^{-5}$ W is obtained for the signal/noise ratio 10 and the receiver noise factor 6 dB. If a 1% efficiency is assumed for the frequency doubling/halving, $P_t'$ will also be equal to the mean power consumption of the transponder. Halving of the frequency reduces the transponder power requirement 64 times in comparison with doubling the frequency, although a baseunit antenna surface area that is 16 times greater is required in return.

Under the same conditions as those described above (B=N*2 MHz, signal/noise ratio=10, noise factor=6 dB, R=500 m), the continuous output power of the base unit on the frequency $f_o$ will be at least $P_t$=N*21*10$^{-5}$ W.

At most, 10 $\mu$W e.i.r.p. according to Televerkets Radiodivision, 77-06-01, is permitted outside the nominal frequency 2450 MHz+/−20 Mhz. These values may be irrelevant, but they give an indication that the frequency halving option is the most practical, quite irrespective of the fact that it gives a more acceptable battery life span in the transponder.

Considerations in Relation to Response Pulse Character

In the case of 50 monitored objects, the response time for each object is only 25/N $\mu$s on each activation occasion in the above example. Only one sample is taken during this period. The next sample is taken on the same object 2500/N $\mu$s later. The sampling rate of the base unit is, in total, 50 times higher, i.e. N*20 ksa/s. Frequency broadening due to the pulse character of the activation is in the order of 1/pulse length=N*40 kHz. Discrete frequencies of N*400 Hz spacing? are obtained in this band. This should not present a problem with regard to signal processing, since the receiver bandwidth for Doppler detection is N*100 Hz in the case studied. The noise power in this band is N*4*10$^{-9}$ W. If the receiver noise factor is 6 dB and the requisite signal/noise ratio for interpretation is assumed to be 14 dB, the requirement $P_1$>N*4*10$^{17}$ W that is required (mean power in the detected frequency band). With these above values, there is then obtained $P_t'$>N$^3$*2.6*10$^4$ W and a mean output power from the transponder which is 100 times greater, since the spectrum contains, in round figures, 100 similar frequency bands that are not made use of. The requisite pulse output power of the transponder is thus N$^3$*26*10$^5$ W; thus roughly the same requirement as that placed on data transmission.

If the low intermediate frequency $f_{LO}$ presents a problem in detection, this intermediate frequency and the sampling frequency $f_S$, may either both be raised, or $f_S$ may be retained and solely $f_{LO}$ raised. The following general relationship must be fulfilled for unequivocal interpretation:

$$M*f_{S+\delta<f_{LO}}<(M+\frac{1}{4})*f_S-\delta f$$

M=0, 1, 2, . . .

where $\delta f$=the maximum value of Abs$\{2*N/\lambda*[dR(t)/dt]\}$ and $M*2*\pi$ must be added in the calculation of arc cos $[V(t)/V_e]$ in accordance with the aforegoing. $\delta f$=N*50 Hz in our example. The above condition results in the condition $f_S$>8*$\delta f$. Sampling frequency and intermediate frequency will preferably be synthesized from a common fundamental frequency, as earlier. The permitted time jitter of the sampling is related to $f_{LO}$ and must thus decrease proportionally when $f_{LO}$ is increased by choosing M>0. A sampling jitter of 0.01/$f_{LO}$s can be tolerated in our example.

The invention being thus described, it will be recognized by persons of skill in the art that the same may be varied in many ways. Such variations are not to be regarded as a departure from the spirit and scope of the invention, and all such modifications as would be recognized by one skilled in the art are intended to be included within the scope of the following claims.

What is claimed is:

1. A system for monitoring a position of movable objects, comprising:

a plurality of movable objects, each of said movable objects equipped with a transponder; and a plurality of nodes arranged to communicate with said transponders, each of said nodes having a register of transponders and monitoring and communicating with those transponders listed in said register, each of said nodes sending a unique signal to each transponder in its respective register to which the transponders, respectively, reply with a response signal containing transponder identification, each of said nodes further including, means for detecting a speed at which each transponder is moving towards or away from said node; and means for delivering an alarm signal when movement of a monitored transponder towards or away from said node exceeds a predetermined value;

said plurality of nodes communicating with each other such that, responsive to specified transponder movement, at least one of said plurality of nodes adds to its respective register a transponder previously monitored by another one of said plurality of nodes; and at least one of said plurality of nodes being mobile, said mobile node including GPS equipment which automatically monitors a current global position of said node, said mobile node monitoring transponders in its respective register in view of said current global position.

2. The system as set forth in claim 1, said alarm delivering means detecting speed of movement and delivering the alarm signal when the transponder moves at a speed greater than a predetermined value.

3. The system as set forth in claim 2, said alarm delivering means determining changes in transponder position based on said detected speed of movement.

4. The system as set forth in claim 2, said speed detecting means detecting a Doppler-shift response from each transponder.

5. The system as set forth in claim 1, wherein said specified transponder movement includes movement outside a permitted area in relation to a monitoring node.

6. The system as set forth in claim 1, wherein said unique signal is coded for an intended transponder, said transponder including a computer which is programmed to activate the transponder for transmission when the code of the unique signal agrees with said transponder identification.

7. A method for monitoring movements of movable objects using a plurality of nodes, comprising the steps of:

providing each of a plurality of movable objects with a transponder;

arranging said plurality of nodes to communicate with said transponders, at least a first node of said plurality of nodes being mobile;

setting-up, for each of said plurality of nodes, an individual register of transponders with which each of said plurality of nodes, respectively, is to communicate, said first node having a register listing at least a first transponder;

sending, by said first node, a unique signal to said first transponder;

sending from the first transponder to the first node, responsive to said unique signal, a response signal having a transponder identification;

detecting, by said first node, a speed and direction at which the first transponder is moving towards or away from said first node taking into consideration a current location of said mobile first node;

evaluating movement of said first transponder relative to said first node using the detected speed and direction; and communicating, by said first node with at least a second node, to enable said second node to add said first transponder to a monitoring register of said second node and to take over monitoring of said first transponder.

8. The method as set forth in claim 7, further comprising the steps of:

delivering, by said first node, an alarm signal when an evaluated position of said first transponder from said first node deviates from a permitted value.

9. The method as set forth in claim 7, further comprising the steps of:

delivering, by said first node, an alarm signal when the detected speed of said first transponder exceeds a predetermined value.

10. The method as set forth in claim 7, wherein said unique signal is coded for the first transponder, said first transponder including a computer which is programmed to activate the first transponder for transmission when the code of the unique signal agrees with said transponder identification for said first transponder.

11. The method as set forth in claim 10, said step of communicating including the step of passing the code for the first transponder from said first node to said second node.

12. The method as set forth in claim 11, said step of communicating including the step of sending a unique signal coded for said first transponder from said second node;

sending, by said first transponder to said second node, a response signal having said transponder identification; and dismissing, by said first node, said first transponder from the register of said first node.

\* \* \* \* \*